United States Patent Office 3,345,398
Patented Oct. 3, 1967

3,345,398
BIS-DIFLUORAMINOETHANE DERIVATIVES
Richard P. Rhodes, Newark, N.J., assignor to Esso Research and Engineering Company, a corporation of Delaware
No Drawing. Filed Aug. 31, 1961, Ser. No. 136,695
14 Claims. (Cl. 260—467)

This invention relates to a new compound 1,2-bis (difluoramino) ethane diol-1,2, represented by the formula:

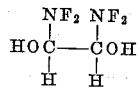

and to its preparation by reaction of glyoxal $$O=HC \cdot CH=O$$

with difluoramine, $HNF_2$.

This invention is also concerned with derivatives that can be synthesized from the diol containing 1 $NF_2$ group per C.

The bis (difluoramino) ethane diol is a solid (95° C. M.P.) of high density (1.72 g./ml.). It is interesting as a high-energy rocket propellant oxidizer in its own right. Also, it is interesting as a reactant for preparation of copolymers useful as high-energy binders and for exchange of other oxidizer or functional groups for the OH groups to prepare new and useful derivatives.

Although some simple aldehydes and ketones of suitable stability at elevated temperatures were found to react with $HNF_2$ to form isolatable difluoramino derivatives, other more complex carbonyl compounds, e.g. compounds with two carbonyl functions, were found to polymerize, and decompose under the same reaction conditions. The presence of small amounts of basic materials almost completely prevent glycol formation. Oppositely, the presence of acidic materials enhances the yield of the glycol. Despite difficulties expected, the $HNF_2$-glyoxal reaction has been effected in accordance with the present invention to accomplish the aim of preparing desired isolatable products.

The $HNF_2$-glyoxal reaction is represented by the following equation:

The use of glyoxal free of inhibiting impurities is important for obtaining satisfactory results. High purity glyoxal has a meltng point of 15° C., a boiling point of 50.4° C., and sp. g. of 1.14. With proper control of the temperature and suitable mixing of the reactants, the reaction is made to take place under pressure of high concentration of $HNF_2$ as shown in the following examples.

EXAMPLE 1

$HNF_2$ in the amount of 2162 cc. measured at 22° C. under 15.19 cm. Hg absolute pressure and vaporized glyoxal, $C_2H_2O_2$, in the amount of 27 cc. measured at 22° C. under 44.2 cm. Hg absolute pressure were condensed into a 10 cc. glass bomb chilled to −126° C. The mixed reactants in the bomb were warmed up to 22° C. and kept at that temperature for 3 hours. The excess $HNF_2$ unreacted was removed by distillation and the liquid product was fractionated by vacuum distillation to recover a high purity distillate product in a yield of 29% of theory. The properties of this product were analyzed as follows:

TABLE I.—PROPERTIES OF BIS (DIFLUORAMINO) GLYCOL

Melting point, °C _____ 95±1
Density, b./cc./at 22° C _____ 1.72±

*Elemental analysis*

| Constituent | Average Found | Theoretical for $C_2H_4O_2N_2F_4$ |
|---|---|---|
| Percent C | 15.8 | 14.6 |
| Percent H | 2.66 | 2.4 |
| Percent N | 16.9 | 17.1 |
| Percent F | 46.1 | 46.3 |
| Percent O | 18.4 | 18.5 |

Infrared spectrum and nuclear magnetic resonance data show presence of the alcohol OH groups, $NF_2$ groups, and C—H bond, consistent with formula of 1,2-bis (difluoramino) ethanediol-1,2, which is also given the name bis ($NF_2$) glycol or bis (difluoramino) glycol.

Reactions of the product as will be later described confirm the structure.

Solubility:
    Insoluble in $CHCl_3$ and $CCl_4$
    Soluble in nitrobenzene, alcohols, ethers and $H_2O$ The solid product was further purified by recrystallization from ethanol solution and sublimation. The main by-product is a white oil having a concentration of $NF_2$ compounds which can be recovered.

Improved yields of the bis ($NF_2$) glycol were obtained by adding the glyoxal to the reaction mixture containing excess $HNF_2$ as shown in the following example.

EXAMPLE 2

$HNF_3$ in the amount of 2162 cc. measured at 22° C. under 19.4 cm. Hg absolute was placed in a 10 cc. bomb, chilled to −126° C. and glyoxal vapor in the amount of 273 cc. at 22° C. under a pressure of 20 cm. Hg absolute was added. The mixture of reactants in the bomb was warmed up to 22° C. asd maintained under pressure for about 1.5 hours. Then, the reaction mixture was cooled and a second increment of glyoxal vapor similar in amount to the first charge was added to the cooled and condensed reaction mixture after which warming to 22° C. (room temperature) and holding at 22° C. for 0.5 hour was repeated. After addition of a third equal, increment of glyoxal vapor, and further reaction at 22° C. under pressure for 16 hours, the product was worked up as in Example 1 and a yield of the bis (difluoroamino) glycol amounting to 41% of theoretical was obtained.

Example 2 demonstrates the importance of keeping the concentration of the $HNF_2$ high relative to the concentration of the glyoxal for obtaining the desired reaction.

Other tests showed that an inert diluent, such as $CCl_4$, $CHCl_3$ or diethyl ether can be used, e.g. in a proportion of about 50% or more with respect to the glyoxal for promoting the desired reaction and reducing explosion danger.

The reaction of the glyoxal with the $HNF_2$ is considered to start at a significant rate at about −10° C. to 0° C. The rate of reaction increases with temperature rise, and a convenient, safe temperature is about 22° C. However, since the rate is not too fast at 22° C., and since the bis ($NF_2$) glycol does not decompose at temperatures up to about 100° C., the reaction temperature may be raised so that the reaction is carried out at temperatures in the range of about −10° C. to about 100° C.

In using the higher reaction temperature above 22° C. steps are taken to keep the glyoxal concentration low, e.g. by adding glyoxal in small increments or by the use of diluents.

EXAMPLE 3

Using the procedures described in the Examples 1 and 2, the diacetate of the bis ($NF_2$) glycol was made directly from glyoxal reacted with $HNF_2$ in the presence of acetic anhydride or acetyl chloride. In using acetic anhydride, more than 1 mole of acetic anhydride is used per mole of glyoxal so that the excess acetic anhydride acts as a diluent and takes up $H_2O$ formed. In using acetyl chloride, more than 2 moles of the acetyl chloride is used per mole of glyoxal. In both instances an inert diluent, e.g. $CHCl_3$ was found useful. The diacetate products recovered by fractional distillation under vacuum were white oils having the same gas chromatography retention time (12.8 relative to 1 for benzene on a silicone column).

The elemental analyses of the products are:

TABLE II.—ELEMENTAL ANALYSES OF DIACETOXY BIS ($NF_2$) GLYCOL ($CH_3COOCHNF_2$)$_2$

|  | From Acetic Anydride | From Acetyl Chloride | Theoretical for ($CH_3COOCHNF_2$)$_2$ |
|---|---|---|---|
| Percent C | 28.4 | 25.0 | 29.0 |
| Percent N | 10.15 | 11.4 | 11.3 |
| Percent F | 28.9 | 32.1 | 30.6 |
| Percent O | 32.15 | 31.5 | 29.1 |
| Percent Cl | 0.4 | 0. | 0.0 |

NOTE.—The small amount of chloride came from $CHCl_3$ diluent.

Nuclear magnetic resonance data showed the product has a structure consistent with the following:

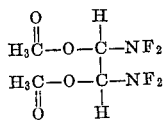

The reaction of glyoxal with $HNF_2$ has been found to be promoted by small or trace amounts (less than 1%) of acidic materials, preferably acidic materials which have ability to combine with water. Materials such as acetyl chloride, hydrogen chloride, sulfur trioxide, dimethyl sulfate are suggested for use as promoters. The promoters may enhance the yields by suppressing polymerization, preventing reaction of the hydroxyl group, and by some other action.

The following example very well demonstrates the promoting action of acetyl chloride used in a trace amount.

EXAMPLE 4

The procedure of Example 2 was used. A thick walled high-pressure glass reactor was used. The total amount of $HNF_2$ charged was 1.38 g. To the $HNF_2$ was added 0.0073 g. acetyl chloride. The glyoxal was added in portions totaling 0.487 g. The excess $HNF_2$ and product was recovered in the manner described in Example 1. The total weight of crude product was 1.429 g. The $HNF_2$ recovered was 0.338 g., 0.942 g. having been absorbed and reacted. Net yields of bis ($NF_2$) glycol obtained were higher than 85% at theoretical. Better yields can be obtained on a larger scale This bis ($NF_2$) diacetoxy or diacetate compound is useful as an intermediate for further conversion to other compounds such as 1,2 bis ($NF_2$) dinitro 1,2 ethane or 1,2 bis ($NF_2$) dinitro 1,2 ethane.

In another esterification reaction, bis ($NF_2$) glycol was reacted with toluene sulfonyl chloride to form a white crystalline product.

The bis ($NF_2$) glycol has been found capable of reacting through the OH groups, as in esterification, condensation or substitution, without destruction of the remainder of the molecule, thus keeping the $CNF_2$ groups intact. For example, the bis ($NF_2$) glycol reacts with diisocyanates under mild conditions (below 50° C.) to form solid polyurethanes to obtain energetic binders for propellants.

The bis ($NF_2$) glycol may be reacted to convert the OH groups to higher energy groups, e.g. nitration to $ONO_2$ groups using agents such as $NO_2Cl$ or $NO_2Br$.

In general, bis ($NF_2$) glycol is indicated to react under known proper mild conditions with organic reagents that replace the hydrogen atom of the hydroxyl groups to form other functional groups, e.g. acetyl, alkoxy, etc. and to react with inorganic reagents under known mild conditions to replace the hydroxyl groups by inorganic radicals, e.g. halogens, nitrate, etc.

As a solid monopropellant, the bis ($NF_2$) glycol has a specific impulse (Isp) of 253.3 seconds, it has the added merits of relatively low temperature burning (about 3188° K.) and high density. High quality solid propellant formulation can be made with its derivatives, such as the following:

*Formulation 1 of Isp 205*

| | Percent |
|---|---|
| Bis ($NF_2$) glycol | 20 |
| Tetrakis ($NF_2$) furan | 10.7 |
| Tetranitromethane | 51.5 |
| Boron powder | 8.5 |
| Polybutadiene-$NF_2$ adduct (55 wt. percent $NF_2$) | 10 |

*Formulation 2 of Isp 287*

| | |
|---|---|
| Bis ($NF_2$) bis (nitro) glycol | 73.6 |
| $N_2H_5C(NO_2)_3$ | 9.4 |
| B | 7 |
| Binder (polybutadiene-$NF_2$ adduct) | 10 |

The stability and melting point of the bis ($NF_2$) glycol are such as to permit convenient mixing and casting or molding of propellant compositions containing it.

Various modifications can be perceived by those skilled in the art and are intended to be included within the scope of this invention.

The invention is claimed as follows:

1. A compound having in its structural formula the configuration:

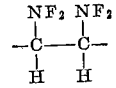

in which each of the carbon atoms is attached to the same functional group selected from the class consisting of hydroxyl, acetoxy, and nitrate.

2. Bis ($NF_2$) glycol having the structural formula:

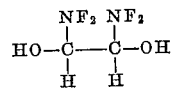

3. A bis ($NF_2$) glycol ester having the formula:

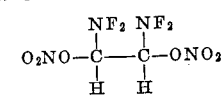

4. A bis ($NF_2$) glycol ester having the formula:

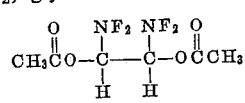

5. Method of preparing a compound of the group consisting of bis ($NF_2$) glycol and esters thereof which comprises reacting glyoxal with excess $HNF_2$ and under conditions to attach an $NF_2$ group to each carbon atom of the glyoxal, and recovering a resulting bis ($NF_2$) glycol product.

6. A method of claim 5 in which the $HNF_2$ is under superatmospheric pressure in contact with glyoxal vapor at a temperature in the range of about −10° C. to 50° C.

7. The method of claim 5, in which the glyoxal is mixed with a diluent and brought into reactive contact with the $HNF_2$.

8. The method of claim 5, in which incremental portions of the glyoxal to be reacted are admixed with the $HNF_2$ for the reaction therewith.

9. The method of claim 5, in which the glyoxal is reacted with the $HNF_2$ in the presence of acetic anhydride and diacetoxy bis ($NF_2$) glycol is recovered.

10. The method of claim 5, in which the glyoxal is mixed with acetyl chloride as a diluent when reacted with the $HNF_2$.

11. Method of preparing bis ($NF_2$) glycol, which comprises mixing glyoxal with an excess of $HNF_2$ at a temperature below $-10°$ C., warming up the resulting reaction mixture to a reaction temperature of about $22°$ C., reacting the glyoxal with $HNF_2$ in the mixture, admixing another portion of glyoxal with the mixture to react with a portion of the excess $HNF_2$ present therein and subsequently recovering resulting bis ($NF_2$) glycol as a product of the reaction.

12. The method of claim 11, in which an acidic organic compound which combines with water is present in the mixture.

13. The method of claim 11, in which a small amount of an acidic material is present in the mixture to promote the reaction in forming bis ($NF_2$) glycol.

14. Method of preparing a bis($NF_2$) glycol ester, which comprises reacting glyoxal with excess $HNF_2$ under mild reaction conditions to form bis($NF_2$) glycol having an $NF_2$ group attached to each carbon atom and reacting the resulting bis($NF_2$) glycol with an esterifying reactant to replace hydroxyl groups of the bis($NF_2$) glycol by ester functions, and recovering the resulting bis($NF_2$) glycol ester.

References Cited

UNITED STATES PATENTS

| | | | |
|---|---|---|---|
| 2,416,639 | 2/1947 | Pearsall | 149—2 |
| 2,864,853 | 12/1958 | Bachman et al. | 260—467 |
| 2,978,484 | 4/1961 | Plaut | 260—467 |
| 3,031,289 | 4/1962 | Philipson | 149—2 |

BENJAMIN R. PADGETT, *Primary Examiner.*

ROGER L. CAMPBELL, LEON D. ROSDOL, CARL D. QUARFORTH, *Examiners.*

J. W. WHISLER, L. A. SEBASTIAN,
*Assistant Examiners.*